United States Patent [19]
Parrish

[11] 4,172,472
[45] Oct. 30, 1979

[54] METHOD OF APPLYING A REPAIR CLAMP TO A PIPE

[75] Inventor: Thomas D. Parrish, Flushing, Mich.

[73] Assignee: Rockwell International Corporation, Pittsburgh, Pa.

[21] Appl. No.: 878,366

[22] Filed: Feb. 16, 1978

Related U.S. Application Data

[62] Division of Ser. No. 816,229, Jul. 18, 1977, Pat. No. 4,091,694.

[51] Int. Cl.² .............................................. F16L 55/18
[52] U.S. Cl. ...................................... 138/97; 138/99; 24/279; 29/402.09; 29/526 R; 137/15
[58] Field of Search ................. 29/526 R, 401 D, 261; 24/279; 138/97; 137/15; 81/9.3; 254/79

[56] References Cited

U.S. PATENT DOCUMENTS

| | | | |
|---|---|---|---|
| 2,566,454 | 9/1951 | Laschke | 81/9.3 X |
| 2,671,310 | 3/1954 | Noack | 29/261 X |
| 2,787,442 | 4/1957 | Lewis | 254/79 |
| 3,108,783 | 10/1963 | Foust et al. | 81/9.3 X |
| 3,220,072 | 11/1965 | Moss | 81/9.3 X |
| 4,054,984 | 10/1977 | Ball et al. | 29/237 |

*Primary Examiner*—Charlie T. Moon

[57] ABSTRACT

A method for rapidly clamping a repair clamp tightly around a pipe which contemplates a number of steps including the steps of taking up slack in the clamp and then applying the necessary clamping force for tightening the clamp on the pipe.

2 Claims, 3 Drawing Figures

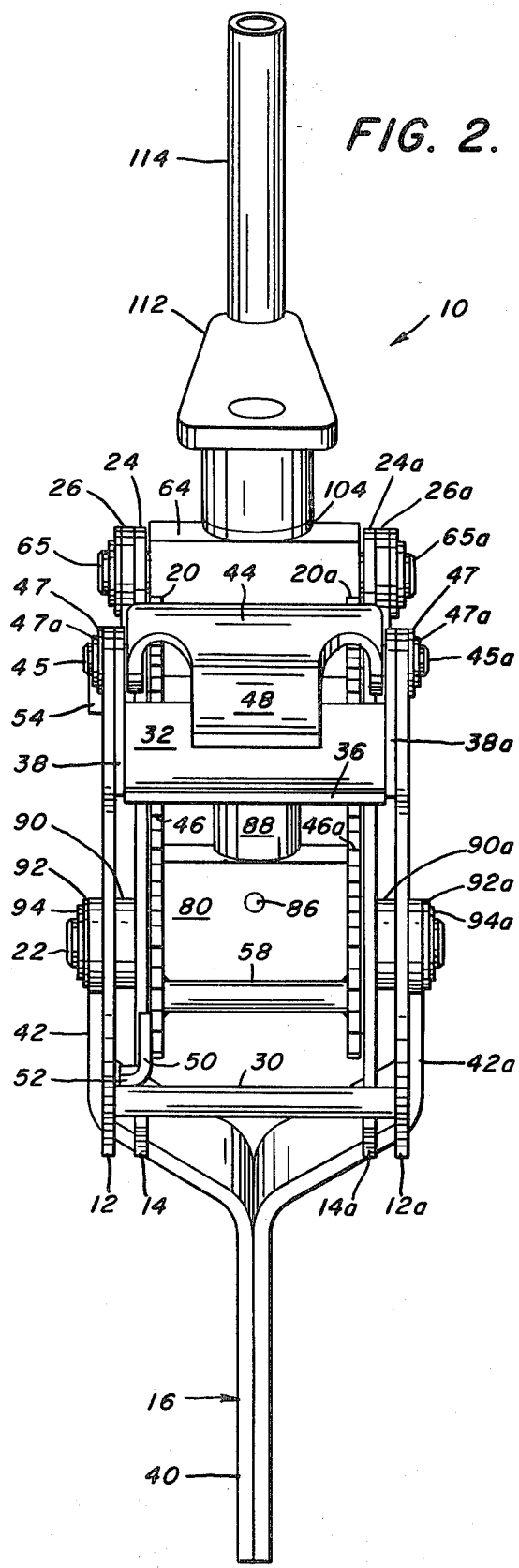
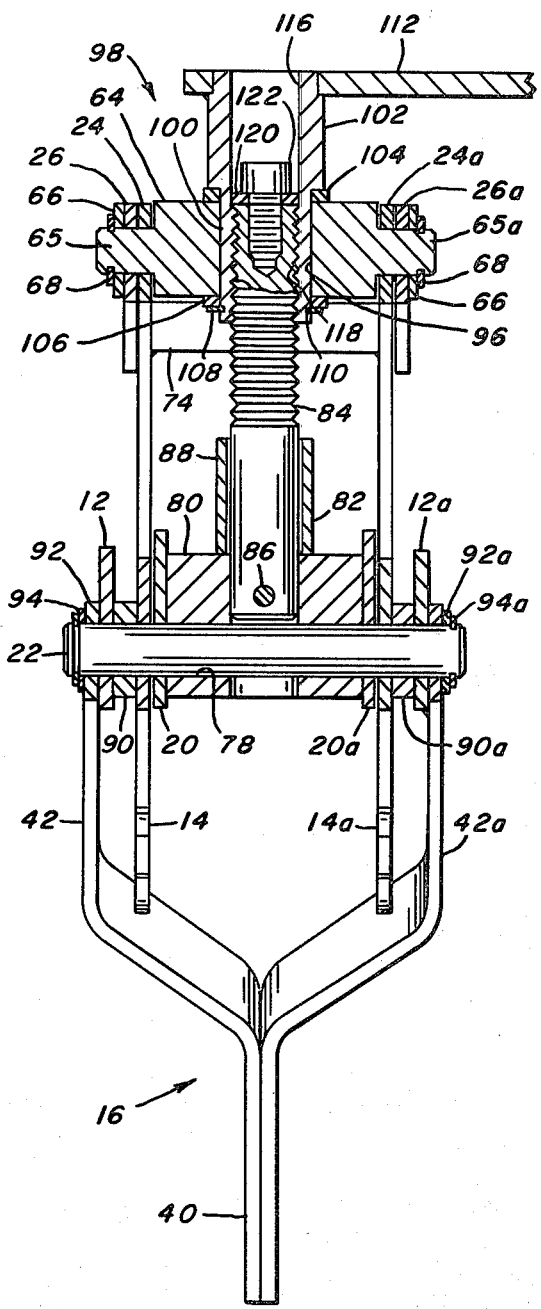

METHOD OF APPLYING A REPAIR CLAMP TO A PIPE

This is a division of application Ser. No. 816,229, filed July 18, 1977, now U.S. Pat. No. 4,091,694 issued May 30, 1978.

BACKGROUND OF THE INVENTION

Repair clamps for repairing leaks in pipes are well-known and widely used. Generally these clamps have a gasket overlain with a metal band encircling the pipe. These bands may be in the form of two half-circles, or a single full circle having a pair of flanges at the longitudinal joint. Bolt and nut assemblies usually connect these flanges and are tightened to draw the band (and the gasket) about the pipe over the leak. In the case of lines which are usually below ground, after excavating for a working area around the leak, the leaking fluid tends to collect in the area, making working conditions hazardous as well as unpleasant. As stated above, the present method of installing the repair clamp includes tightening the nuts on the bolts with a socket wrench or the like. This is relatively time-consuming.

SUMMARY OF THE INVENTION

It is accordingly a primary object of this invention to provide a tool for drawing together the flanges of a repair clamp in a rapid manner, and providing a tight shut-off while the clamp bolt-and-nut assemblies are being drawn up.

It is another important object of this invention to provide two lever systems in a tool, one for rapid closure while the resistance is relatively low, and a second for exerting considerably greater closing force.

It is another object of this invention to provide a method of rapidly and positively shutting off a leak from a fluid-filled pipe using a repair clamp assembly and the tool of the instant invention.

The instant invention is a compound tool designed for particular use with repair clamps useful in sealing leaks in fluid pipe lines, but also finding utility in other areas where spaced flanges are to be brought closer together. One prior art patent, U.S. Patent 3,108,783, solves a portion of this problem in a very limited fashion, but does not envision anything like the solution presented herein.

The novel features which are considered as characteristic of the invention are set forth in particular in the appended claims. Also, a method of applying a repair clamp to a pipe is claimed. However, for a full understanding of the tool, attention is directed to the following embodiment, shown in the drawings and described herein.

BRIEF DESCRIPTION OF THE DRAWINGS

FIG. 2 is an end view of the tool of FIG. 1; and,

FIG. 3 is a section along the line III—III of FIG. 1.

DESCRIPTION OF THE PREFERRED EMBODIMENT

Figure 1:
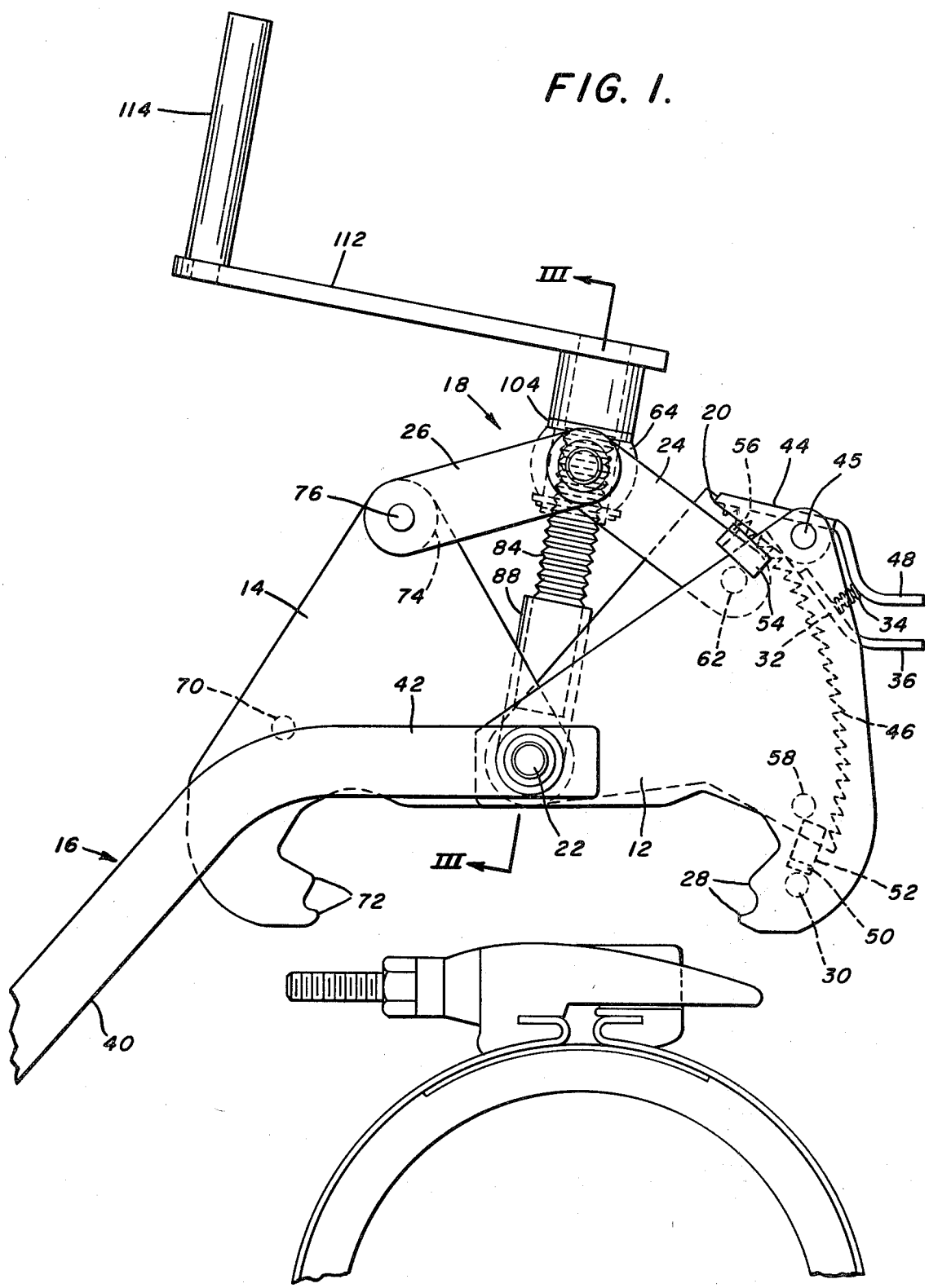
FIG. 1 is a side view of the tool of the instant invention.

The tool 10, as seen in FIG. 1, resembles in general outline a miniature of the clam-shell buckets used on heavy construction cranes. The pairs of jaws 12 and 12a and 14 and 14a move similarly to those aforementioned buckets. However, a handle assembly 16 is fixed to jaws 12 and 12a, and a screw-lever assembly 18 is connected between jaws 14 and 14a and ratchets 20 and 20a for a greater mechanical force application between the jaws 12 and 14.

By inspection of FIG. 2, it can be seen that the jaws 12 and 12a and 14 and 14a are each paired, as is ratchet plate 20 and 20a. Each pair operates as a unit, having cross-braces between them and a common axle 22 about which all of them rotate. For this reason, when the expression "jaw or "ratchet" is used in the singular, the plural is usually intended. The same is also true of the two-bar linkages 24 and 24a and 26 and 26a which connect jaws 14 to ratchet plates 20.

Referring now to the Figures, front jaws 12 and 12a are mounted to pivot about axle 22, and are joined adjacent the gripping surfaces 28 by a stiffener-cross member 30. These gripping surfaces 28 are adapted to engage one flange of a repair clamp, with the two front jaws 12 and 12a spaced to straddle one bolt seat. At the top of the jaws 12 and 12a as seen in the Figures, another stiffener-cross member 32, which also acts as a retainer for a spring 34 and has a protruding portion 36, projecting outwardly for a purpose to be discussed later, connects the two front jaws 12 and 12a and reinforces them with upstanding flange portions 38 and 38a fixed to jaws 12 and 12a, respectively.

Projecting rearwardly from front jaws 12 and 12a is the handle assembly 16. This assembly has a grip portion 40 at the extreme rear of the tool 10, which divides into a bifurcated member, each leg 42 and 42a being fixed to the outside of a front jaw, 12 and 12a respectively. The legs are fixed to their respective jaws by welding or other suitable means, and is located surrounding axle 22, with the legs having a suitable bore for receiving axle 22.

Pivotally mounted atop the front jaws is a pawl 44, which is biased into engagement with the teeth 46 and 46a of ratchets 20 and 20a, respectively, by pawl spring 34. Pawl 44 has fixed on either side, stub shafts 45 and 45a which are received in bores through flanges 38 and 38a, respectively, and front jaws 12 and 12a, respectively. The shafts 45 and 45a are axially retained in these bores by suitable means, such as washers 47 and retaining rings 47a. As is usual with a ratchet-pawl combination, front jaws 12 and 12a can move clockwise about axle 22 as seen in FIG. 1, with pawl 44 riding over the teeth 46 and 46a, but in order to move the front jaws counter-clockwise with respect to the ratchets, pawl 44 must be lifted out of engagement. A handle portion 48 projects forwardly generally parallel to and spaced apart from, the protruding portion 36 of the upper cross member 32. By grasping handle 48 and protruding portion 36, pawl 44 may be lifted clear of teeth 46 and 46a, and this is free to move either way about axle 22. Stop members are provided to limit the relative movement of jaws 12 and 12a with respect to ratchets 20 and 20a. On the outside of ratchet 20, between ratchet 20 and jaw 12, an L-shaped stop member 50 is fixed to ratchet 20, with the horizontal leg 52 projecting toward jaw 12. This stop is positioned to contact cross member 30 in the position shown in the Figures, to limit the travel of jaws 12 and 12a in the counter-clockwise direction as seen in FIG. 1. Additionally, another L-shaped stop member 54 is fixed on the outside of jaw 12, with leg 56 turned inwardly towards ratchet 20. When jaws 12 and 12a are rotated clockwise as seen in FIG. 1, leg 56 contacts leg 52 on stop member 50, preventing pawl 44 from running off ratchet teeth 46.

The above-described front jaw-ratchet interaction, where the front jaws 12 and 12a are moved by handle 16 relative to ratchets 20 and 20a, is one lever assembly for fast closing action against relatively minor resistance. There is a second lever assembly for applying greater force, which will now be described. It was mentioned above that the ratchets 20 and 20a are connected to act as a unit. They have cross members similar to the lower cross member 30 of the front jaws 12 and 12a. One such cross member 58 is seen in FIG. 2, while the other cross member 60 is positioned on the axis of the connection journals of links 24 and 24a. These cross members 58 and 60 may be of any configuration that provides proper spacing of the ratchets 20 and 20a, and stiffens them so that they act together. It was found convenient to make cross member 58 of solid construction, while cross member 60 was made of hollow tubing (not shown), then a rod member 62 inserted through the tubing and projecting from the outer side of each of ratchets 20 and 20a, respectively, to provide a bearing for links 24 and 24a. This rod member 62 projects beyond the links on either side, and is fastened in place in any suitable manner. Peening the end of the rod is satisfactory, or retaining rings (not shown) received in suitable grooves in rod 62. The other end of link 24 (and of 24a) is journaled on a block 64 having its ends 65 and 65a shaped to receive the links 24 and 26 on one side, and 24a and 26a on the other. These links ends are fastened on the block using washer 66 and retaining ring 68 on each side.

Rear jaws 14 and 14a are similarly constructed to the front jaws and the ratchets to act as a unit. A cross member 70 is fixed between the jaws near the gripping surfaces 72 (which are similar to gripping surfaces 28 on the front jaws). Another cross member 74 is positioned at the axis of the journal of the connection with links 26 and 26a. Cross member 74 is constructed similar to cross member 60, with hollow tubing providing rigidity and spacing to the jaws 14 and 14a, and a rod 76 is inserted through the tubing and projecting from jaws 14 and 14a to provide a bearing for links 26 and 26a, respectively. The links are connected to the rear jaws in the same fashion as the front links are fastened to the ratchet plates as described above.

Referring now to FIGS. 2 and 3, it will be seen that axle 22 is mounted in a longitudinal bore 78 in a block 80. A transverse bore 82 receives a threaded rod 84, which is fixed in place by a pin 86. A stop member 88 is fixed atop block 80 for a reason to be explained later.

Axle 22 has block 80 centered on its longitudinal axis and ratchets 20 and 20a fit against the ends of block 80. Abutting ratchets 20 and 20a on axle 22 are rear jaws 14 and 14a, respectively. Abutting rear jaws 14 and 14a are spacer washers 90 and 90a, respectively. Bearing against the outer faces of spacers 90 and 90a are front jaws 12 and 12a and attached handle legs 42 and 42a, respectively. Retaining the whole assembly on axle 22 are washers 92 and 92a and retaining rings 94 and 94a, respectively.

Returning our attention to block 64 which has the links 24, and 26 and 24a and 26a mounted as pairs on respective ends, it can be seen by observing FIG. 3 that there is a transverse bore 96 through it aligned with bore 82 in block 80. Journaled in bore 96 is crank assembly 98. Crank assembly 98 has a stem 100 journaled in bore 96. Stem 100 has an enlarged portion 102 above block 64, which seats on a thrust bearing 104. Below block 64, another thrust washer, or bearing, 106 is retained in place by retaining ring 108 seated in a groove 110 in stem 100. A crank arm 112 and hand grip 114 provide the leverage to turn crank assembly 98. Stem 100 has a through bore 116, threaded on the bottom portion with threads 118 to match rod 84. The upper end of bore 116 is enlarged for provision of a stop member 120 fixed atop rod 84 by a capscrew 122.

It will thus be seen that the second lever system comprises a two-bar linkage with provision for changing the angle between the links, thus moving the rear jaws 14 and 14a with respect to ratchets 20 and 20a by means of a screw jack type of leverage. The stop 120 limits the upward movement of crank assembly 98, while stop member 88, fixed to block 80, limits the downward movement of the crank.

The foregoing describes a tool particularly useful in rapidly tightening leak repair clamps around a leak in a fluid pipe line. Referring to FIG. 1, in which the clamp is shown in dashed lines wrapped about the pipe at the point of leakage, the tool can be grasped by the hand grip 114 of the screw-lever assembly with one hand, and the grip portion 36 of the stiffner 32 with the other hand. The gripping surfaces 72 of rear jaws 14 and 14a are placed on one flange of the repair clamp, straddling a bolt with jaws 14 and 14a. The front jaws 12 and 12a are then lowered to contact the other flange of the repair clamp. Holding the screw lever assembly 18 in position with the hand holding grip 114, the other hand moves to grip 40 and is lifted (or brought toward the first hand). This moves front jaws 12 and 12a along with pawl 44, down over ratchet plates 20 and 20a and pawl 44 rides down teeth 46 and 46a of the ratchets. Upon encountering more resistance than the operator can overcome with this lever system, pawl 44 is allowed to seat itself in the nearest teeth of the ratchets, and the crank 98 is then turned to actuate the screw-lever assembly 18. By cranking crank assembly 98 downwardly on rod 84, the included angle between links 26, 26a and 24, 24a becomes greater, pushing ratchets 20 and 20a clockwise about axle 22 with respect to rear jaws 14 and 14a. Through engagement of teeth 46, 46a with pawl 44, front jaws 12, 12a are also rotated the same way, providing a much greater closing force between jaw surfaces 28 and 72 than was possible with the first lever system.

Upon attaining shut-off of the leaking fluid, the bolts of the repair clamp can be tightened, and the tool of the subject invention removed. To remove the tool after the clamp bolts have been tightened, one merely releases the pressure by reversing the rotation of crank 98 for a portion of a revolution, then the pawl 44 may be disengaged from the ratchet teeth 46, 46a, and the front jaws 12, 12a moved to their fully retracted position with respect to ratchets 20, 20a (that shown in FIG. 1). After removing the tool from the clamp, it is a good idea to fully retract the crank assembly 98—that position shown in FIGS. 1 and 3—to be ready for the next use.

It will be seen from the above description and the drawings that a novel tool and method of using it have been invented.

Accordingly, I claim:

1. A method of pulling opposed flanges toward each other comprising the steps of:
   (1) Opening the jaws of the tool used in pulling the flanges to the widest setting;
   (2) Engaging said jaws with the outer sides of said opposed flanges;

(3) Using one lever system on said tool to effect rapid closing movement of said jaws, until resistance to jaw movement equals or exceeds the force applied through said one lever system; and, (4) Using a second lever system to effect further closing movement of said jaws, until the desired flange proximity is attained.

2. A method of applying a repair clamp to a pipe, comprising the steps of:

(1) Selecting the proper repair clamp;

(2) Encircling the pipe with said clamp;

(3) Opening the jaws of the repair clamp application tool to the widest setting;

(4) Engaging said jaws with the outer faces of the flanges on said repair clamp;

(5) Using one lever system on said tool to effect rapid closing movement of said jaws, until resistance to jaw movement equals or exceeds the force applied through said one lever system;

(6) Using a second lever system to effect further closing movement of said jaws, until said repair clamp is tightened sufficiently to control leakage from said pipe;

(7) Tightening the fastener assemblies associated with said repair clamp; and, (8) Loosening and removing said repair clamp application tool.

* * * * *